United States Patent Office 3,075,878
Patented Jan. 29, 1963

3,075,878
FUNGICIDAL COMPOSITION OF POLYOXYALKYLENE GLYCOL SURFACE ACTIVE AGENT AND POLYAMIDOHYGROSTREPTIN OR POLYAMINOHYGROSTREPTIN, AND METHOD OF USE
Jack Ziffer, Milwaukee, Wis., assignor to Pabst Brewing Company, Chicago, Ill., a corporation of Delaware
No Drawing. Filed Aug. 31, 1959, Ser. No. 836,889
14 Claims. (Cl. 167—65)

This invention relates to a new and improved fungicidal composition and particularly to a composition containing an antifungal antibiotic identified by the arbitrary names Phytoactin and Phytostreptin, now known by the non-proprietary names of "polyamidohygrostreptin" and "polyaminohygrostreptin," respectively. The new composition is characterized by containing a surface active agent, which increases the utility of the antifungal materials.

This application is a continuation-in-part of my joint patent application with Sachiko J. Ishihara, Thomas J. Cairney and Alfred W. Chow, Serial No. 628,769, filed December 17, 1956, now abandoned, entitled "Phytoactin and Production Thereof."

The antifungal antibiotics, phytoactin and phytostreptin are described and claimed in my aforesaid joint patent application and in the application of the same inventors, Serial No. 659,818, filed May 17, 1957, now abandoned, entitled "Phytostreptin and Production Thereof." The present disclosures in these applications are incorporated herein by reference to avoid excessive repetition.

The antifungal antibiotic polyamidohygrostreptin (Phytoactin) and its method of preparation are disclosed and claimed in U.S. Patent 3,032,471 which is a continuation-in-part of Serial No. 628,769 and Serial No. 659,818. The antifungal antibiotic polyaminohygrostreptin (Phytostreptin) and its method of preparation are disclosed and claimed in U.S. Patent 3,032,470 which is a continuation-in-part of Serial No. 659,818.

Each of the antifungals, polyamidohygrostreptin (Phytoactin) and polyaminohygrostreptin (Phytostreptin) is formed during cultivation under controlled conditions of a different culture of a species in the genus Streptomyces. The cultures closely resemble each other but have certain morphological and biochemical differences. The antifungals also closely resemble each other but are readily differentiated as set forth in the above-identified application, Serial No. 659,818. Each of the substances is particularly effective against fungi as disclosed in the above applications, and in particular, each has been shown to be an effective fungicide for the control of plant diseases. Activity has been demonstrated against such diseases as tomato early blight, tomato late blight, bean rust, and wheat leaf rust. These diseases are caused respectively by *Alternaria solani* (Ell. and Mort.) Jones and Grout, *Phytophthora infestans* (Mont.) de Bary, *Uromyces phaseoli* (Pers.) Wint. and *Puccinia rubigo-vera* (DC.) Wint.

It has now been discovered in the invention that compositions of polyamidohygrostreptin (Phytoactin) and polyaminohygrostreptin (Phytostreptin) are substantially improved by the incorporation of a surface active agent. The antifungal activity against plant pathogens is much enhanced and results in a marked reduction in the effective concentration of the antifungal. The invention also provides improvements in the use of antifungal concentrates which contain other extraneous substances.

The antifungals recovered from fermentation products are accompanied by extraneous substances which may be separated by a series of purification steps. However, such purification adds to the cost of the antifungals, and it is not necessary in using them for certain purposes, such as in agriculture, that the extraneous substances be removed. Consequently, the antifungals are desirably employed in the form of technical grade preparations. In using the preparations in aqueous solution or dispersion, the extraneous substances have tended to precipitate and interfere with the use of the compositions. The precipitation is especially undesirable when aqueous spray solutions are used. The precipitation is prevented when the composition of the invention is employed.

The preferred composition of the invention is a combination of Phytoactin or Phytostreptin and a polyoxyalkylene glycol monoether surface active agent. This preferred class of surface active agents provides the important advantage of enabling the use of technical grade preparations or concentrates of Phytoactin and Phytostreptin. Various members of this class of surface active agents also produce surprising increases in the antifungal activity and reductions in the required concentrations for control of plant diseases. Some of the compositions are more active than others, and the increased activity is at times more pronounced against one disease than against another. The most advantageous results are obtained by selection of a surface active agent which is most effective for the intended use.

The polyoxyalkylene glycol surface active agents are preferably monoethers of the glycols, and contain a terminal hydroxyl group and a terminal ether group in which a glycol hydroxyl group is etherified with a hydrophobic hydroxy compound. The compounds are thus composed of a hydrophobic group and a hydrophilic polyoxyalkylene group having a terminal hydroxyl radical. This class of compounds exhibiting surface activity in aqueous compositions is well known, as is their preparation from a hydrophobic hydroxy compound and alkylene oxide, preferably ethylene and/or propylene oxide. The surface active agents are classified as non-ionic, although they may be sulfated at the terminal hydroxyl group, which renders them anionic. A sulfated compound may contain a lesser number of oxyalkylene groups in the hydrophilic chain than a similar unsulfated product. The surface active agents are water soluble or water dispersible.

The number of oxyalkylene groups present is preferably from 4 to 60 or more, further preferably about 8 to 20, and the molecular weight of the polyoxyalkylene radical is preferably in the range of 200 to 6000, further preferably 300 to 1000. The hydrophobic hydroxy compound radical preferably contains about 10 or more carbon atoms, further preferably about 10 to 24 carbon atoms.

The preferred hydrophobic hydroxy compound radicals are derived from alkyl phenols which are generally phenol monoalkylated or dialkylated with an alkyl radical containing about 4 carbon atoms or more, preferably 6 to 18 carbon atoms. The hydrophobic hydroxy compound may be a higher alcohol, e.g., having 12 to more carbon atoms, including the esterified and etherified polyhydric alcohols. Of these compounds, a preferred class is represented by polyhydric alcohols, e.g., hexitols partially esterified by a higher acid having for example 12 or more carbon atoms.

acids are especially suitable. Representative preferred polyhydric alcohols are sorbitol and sorbitan.

In agricultural use, the antifungals are preferably applied from aqueous solution or dispersion. Phytostreptin is water soluble and Phytoactin is slightly soluble in water, the latter producing an homogeneous colloidal solution. The antifungals are provided in the first instance, in the form of a concentrate in a water miscible organic solvent, which preferably contains the surface active agent. The solvent in each case is preferably a lower alkanol such as methanol, ethanol, and isopropanol. The concentration of the antifungal is preferably in the range of 10 to 250 milligrams per milliliter. The surface active agent is preferably present in a weight ratio to antifungal in the range of about 5 to 125:1. The concentrate either containing or preferably first mixed with the surface active agent is diluted with water to the use concentration. The concentration of the solvent in the dilute aqueous composition is within several percent, and the solvent does not significantly affect the results.

In the aqueous composition for application to the plants, the antifungal is present in a fungicidal concentration. The antifungal concentration in the dilute aqueous composition is preferably in the range of 0.1 to 400 parts per million. The exposed surfaces of the plants may be wetted as by spraying over a substantial proportion of their area, or the composition may be injected into the plants as commonly practiced in the treatment of vascular diseases of trees.

The surface active agent is provided in the aqueous composition in an effective concentration, and in a concentration which will increase the activity and reduce the active concentration of the antibiotic in the cases where the surface active agent potentiates the antifungal. The concentration of the surface active agent in the aqueous composition applied to the plants is preferably in the range of 1 to 5000 parts per million, further preferably about 100 to 3500 p.p.m. or 0.01 to 0.35% by weight.

A relatively pure form of the antifungal may be used, but as noted above, it is preferred to use a technical grade product to increase the economy and availability of the materials. Such technical grade products may be obtained in any stage of the recovery of the antifungal from the fermentation product. It is preferred that the product be concentrated sufficiently so that the antifungal content is in excess of about 25 milligrams per gram of solids. These concentrates may be obtained from the fermentation product, for example by filtering the whole culture at a pH of about 7–8, to remove the cellular debris, and acidifying the filtrate to a pH of about 3–5 to precipitate the antifungal antibiotic. The antifungal is extracted from the precipitate into an organic solvent such as one of the lower alkanols or a ketone such as acetone or methylisobutyl ketone. The solvent extract may be employed as the initial antifungal concentrate having the foregoing degree of purity. It is generally preferred to extract the antifungal into methanol or isopropanol, and ultimately mix the alcoholic concentrate with the surface active agent and then dilute with water. Alternatively, the fermentation whole culture (pH 7) is dried on a vacuum rotary drier (29 inches vacuum, 15 lbs. per square inch steam pressure) and the dried solid extracted with isopropanol. The solvent extract is concentrated to the desired antibiotic concentration and mixed with surface active agent prior to dilution with water. The problem of precipitation of extraneous substances upon dilution with water is overcome in this manner, and the effectiveness of the antifungal in combating pathogenic fungal organisms is enhanced.

The utility and effectiveness of the new compositions have been demonstrated in a number of tests with plants inoculated with spores of the previously described fungi. Bonny Best tomato plants and pinto bean plants were used for the tests. The phytotoxicities of the compositions were also evaluated, and were found to be generally acceptable. Toxicity was observed in some cases at higher concentrations, due to the correspondingly higher concentrations of the surface active agent. Since the active concentration is generally substantially lower and the concentration of the surface active agent may be reduced and appropriate selection thereof be made, this should present no problem.

The following examples are furnished to assist in providing a complete understanding of the invention. It is to be understood that the invention is not limited thereto nor to the specific ingredients, proportions and procedures set forth therein, which are furnished only for purposes of illustration. In the tests described in the examples, potted plants were sprayed on a turntable by means of a spray gun, under standard conditions, with various dilutions of the antifungal preparations. After the plants had dried, they were inoculated with spores of the test organisms produced under standard conditions. The inoculated plants were placed in humidity chamber for 24 hours and then returned to the greenhouse. After several days, necrotic spots appeared on the leaves, and they were counted and expressed as a percentage of the control untreated plants. The resulting dosage-response data were plotted on logarithmic probability paper, and the concentration in parts per million of antifungal necessary to give 95% control of the respective disease ($ED_{95}$) determined.

EXAMPLE 1

In tests summarized in the following Table I, the compositions of the invention prepared from technical grade

*Table 1*

| | $ED_{95}$ (p.p.m.) | | |
|---|---|---|---|
| | Tomato early blight | Tomato late blight | Bean rust |
| Preparation: | | | |
| Zinc ethylene bisdithiocarbamate | >200, >200 | >200, >200 | 64, >64 |
| Phytoactin, purified | 43, 68 | 70, >200 | >20, >20 |
| Phytostreptin, purified | 50, 105 | 86, 120 | 11, >20 |
| Technical grade antifungal preparation: | | | |
| Phytoactin [1] | 70, 44 | 160, >200 | >20, 13 |
| Phytoactin [1] plus Triton X-155 | <20, <20 48, 152 | <20, 88 112, 120 | 12, 4.2 —, 4.3 |
| Phytoactin [2] | | | |
| Phytoactin [2] plus Triton X-155 | <16, <16 56, 54 | <16, 66 73, 100 | 7.2, 14 >20, 10 |
| Phytostreptin [3] | | | |
| Phytostreptin [3] plus Triton X-155 | <20, 45 | <20, 42 | 18, 2.5 |

| Phytotoxicity [4] | | | | | |
|---|---|---|---|---|---|
| Bonny Best tomatoes | | | Pinto beans | | |
| Concentration, p.p.m. | | | | | |
| 20 | 64 | 200 | 0.2 | 2 | 20 |
| Preparation: | | | | | |
| Phytoactin, purified | 0 | 0 | 0 | 0 | 0 | 0 |
| Phytostreptin, purified | 0 | 0 | 0 | 0 | 0 | 0 |
| Technical grade antifungal preparation: | | | | | |
| Phytoactin [1] | 0 | 0 | 0 | 0 | 0 | 0 |
| Phytoactin [1] plus Triton X-155 | 0 | 0 | 0 | 0 | 0 | 0 |
| Phytoactin [2] | 0 | 0 | 0 | 0 | 0 | 0 |
| Phytoactin [2] plus Triton X-155 | 0 | 0, L | L, M | 0 | 0 | 0 |
| Phytostreptin [3] | 0 | 0 | 0 | 0 | 0 | 0 |
| Phytostreptin [3] plus Triton X-155 | 0 | 0, L | V, M | 0 | 0 | 0 |

[1] Isopropanol concentrate, 60 mg. antibiotic per ml.
[2] Methanol concentrate, 96 mg. antibiotic per ml.
[3] Methanol concentrate, 132 mg. antibiotic per ml.
[4] Phytotoxicity (duplicate plants) at indicated p.p.m.
NOTE.—0=None; V=Very slight; L=Slight; M=Moderate.

antifungal preparations, were compared with like compositions containing no surface active agent, with compositions of the substantially pure antifungals containing no surface active agent, and with the commercial antifungal zinc ethylene bisdithiocarbamate. The technical grade Phytoactin preparations 1 and 2 contained about 150 and 240 milligrams, respectively, of Phytoactin per gram of solids, and the technical grade Phytostreptin preparation contained about 330 milligrams of Phytostreptin per gram of solids.

The zinc ethylene bis-dithiocarbamate was dispersed in water and sprayed on the plants. The pure form of the Phytoactin or Phytostreptin was dissolved in methanol and diluted with water to the test concentrations, to produce an aqueous composition for spraying containing about 5% of methanol at a concentration of 100 p.p.m. of the antifungal. The technical grade antifungal solvent concentrates not employed with surface active agent were diluted with three additional volumes of the solvent present in the concentrate and then with water to the test concentrations. The technical grade antifungal solvent concentrates combined with surface active agent were combined with one volume of the surface active agent and two volumes of the solvent present in the concentrate. The additional two volumes of solvent were unnecessary and added merely for convenience in preparing constant sample volumes.

The surface active agent was a non-ionic water-dispersible dimeric alkyl aryl polyether alcohol identified as Triton X-155 (Rohm and Haas).

Additional tests were conducted in like manner and the results are reported in the following Table II.

*Table II*

| | $ED_{95}$ (p.p.m.) | | |
|---|---|---|---|
| | Tomato early blight | Tomato late blight | Bean rust |
| Preparation: | | | |
| Zinc ethylene bisdithiocarbamate | >200, >200 | >200, >200 | >64, — |
| Phytoactin, purified | 130, 50 | 52, 85 | >20, >20 |
| Phytostreptin, purified | 80, 70 | 160, 82 | 15, 9 |
| Technical grade antifungal preparation: | | | |
| Phytoactin [5] | 89, 60 | 79, 110 | 14, >20 |
| Phytoactin [5] plus Triton X-155 | <20, <6.4 | <20, 20 | 7.4, 2.6 |
| Phytostreptin [6] | 76, 65 | 75, 81 | >20, 15 |
| Phytostreptin [6] plus Triton X-155 | <20, <6.4 | <20, 10 | 3.5, 7 |

| | Phytotoxicity [4] | | | | | |
|---|---|---|---|---|---|---|
| | Bonny Best tomatoes | | | Pinto beans | | |
| | Concentration, p.p.m. | | | | | |
| | 20 | 64 | 200 | 0.2 | 2 | 20 |
| Preparation: | | | | | | |
| Phytoactin, purified | 0 | 0 | 0 | 0 | 0 | 0 |
| Phytostreptin, purified | 0 | 0 | 0 | 0 | 0 | 0 |
| Technical grade antifungal preparation: | | | | | | |
| Phytoactin [5] | 0 | 0 | 0 | 0 | 0 | 0 |
| Phytoactin [5] plus Triton X-155 | 0 | 0 | 0 | 0 | 0 | 0 |
| Phytostreptin [6] | 0 | 0 | 0 | 0 | 0 | 0 |
| Phytostreptin [6] plus Triton X-155 | 0 | 0, L | 0, MS | 0 | 0 | 0, L |

[4] Phytotoxicity (duplicate plants) at indicated p.p.m.
[5] Isopropanol concentrate, 97 mg. antibiotic per ml.
[6] Isopropanol concentrate, 77 mg. antibiotic per ml.
NOTE.—0=None; L=Slight; M=Moderate; S=Severe.

EXAMPLE 2

Aqueous phytoactin compositions were prepared by dissolving substantially pure Phytoactin in methanol and diluting with water, with and without the combined use of a surface active agent. The final methanol concentration was less than 6%. Plants were treated as previously described. The surface active agents were polyoxyethylene sorbitan monolaurate and polyoxyethylene sorbitan trioleate, identified as Tween 20 and Tween 85 (Atlas Powder Co.), respectively. The results are given in the following Tables III and IV.

*Table III*

| | $ED_{95}$ (p.p.m.) | | |
|---|---|---|---|
| Surface active agent | Tomato early blight | Bean rust | Wheat leaf rust |
| None | 60, 22 | 4.5, 20, 10 | 1 |
| 0.2% Tween 20 | 90, 38 | 0.2, 10, 6 | 0.4 |

| | | Phytotoxicity [4] | |
|---|---|---|---|
| | Antibiotic concentration, p.p.m. | Bonny Best tomatoes | Pinto beans |
| None | 0.2 | 0, V | 0 |
| | 2.0 | 0, V | 0 |
| | 20.0 | 0, L | 0 |
| 0.2% Tween 20 | 0.2 | 0 | 0 |
| | 2.0 | 0 | 0 |
| | 20.0 | 0 | 0 |

[4] Phytotoxicity (duplicate plants) at indicated p.p.m.
NOTE.—0=None; V=Very slight; L=Slight.

*Table IV*

| Surface active agent | Antibiotic concentration, p.p.m. | Percent disease control, tomato early blight |
|---|---|---|
| None | 2 | 39.5 |
| | 5 | 65 |
| | 10 | 76.7 |
| | 25 | 90.9 |
| | 50 | 94.6 |
| | 100 | 97.2 |
| 0.1% Tween 85 | 2 | 86.3 |
| | 5 | 86 |
| | 10 | 89 |
| | 25 | 94.2 |
| | 50 | 93.8 |
| | 100 | 96.4 |

EXAMPLE 3

Phytoactin preparations and zinc ethylene bis-dithiocarbamate were formulated and compared in the manner of Example 1. The purified Phytoactin was dissolved in methanol and diluted with water, and the technical grade Phytoactin was present in isopropanol solution at a concentration of 60 milligrams per milliliter and the dilution solvent was isopropanol. The purity of the technical grade Phytoactin was about 150 milligrams per gram of solids. The results are given in the following Table V.

Table V

| | ED$_{95}$ (p.p.m.) | | |
| --- | --- | --- | --- |
| | Tomato early blight | Tomato late blight | Bean rust |
| Preparation: | | | |
| Zinc ethylene bisdithiocarbamate | >100, >100, >200 55, <20, 47 | >100, >100, >200 110, 52, 100 | >32, >32 9.4, 17 |
| Phytoactin, purified | | | |
| Technical grade phytoactin preparation: | | | |
| No surface active agent | 48, 36, >120 | 114, >120, >120 59, 24 | >12, 4.3 7.8, >12 |
| Plus Triton X-45 | 12, 23 | >120, 54 | 7.5, 9 |
| Plus Triton X-100 | <12, 108 | 45, 11, 48 | 6.6, 5.4 |
| Plus Triton X-155 | <12, <12, <12 | 29, 52 | >12, 7.2 |
| Plus Igepal CO-430 | 12, —⁷ | 35, 36 | 11, 5.3 |
| Plus Igepal CO-530 | 23, 16 | 53, >120 | >12, 9.6 |
| Plus Igepal CO-630 | 22, <12 | >120, 114, >120 | 12, 3.8 |
| Plus Emulphor EL-620 | 43, 59, 30 | 26, 21 | >12, >12 |
| Plus Tergitol NPX | —⁷ 42 | 63, 31, 84 | >12, 1.2 |
| Plus Agriwet A | 81, 30, <12 | 45, 120 | >12, 12 |
| Plus Brij 30 | 72, 54 | >120, 75, 63 | >12, 12 |
| Plus Atlox 1045A | 29, 53 | >120, 105, 60 | —⁷ >12 |
| Plus Atlox 1256 | 13, 32, 17 | 36, >120 | —⁷ 12 |
| Plus Arctic Syntex 036 | 17, 27 | | |

| | Phytotoxicity⁴ | | | | | |
| --- | --- | --- | --- | --- | --- | --- |
| | Bonny Best tomatoes | | | Pinto beans | | |
| | Concentration, p.p.m. | | | | | |
| | 20 | 64 | 200 | 0.2 | 2 | 20 |
| Preparation: Phytoactin, purified | 0 | 0 | 0 | 0 | 0 | 0 |
| Technical grade Phytoactin preparation: | | | | | | |
| No surface active agent | 0 | 0 | 0 | 0 | 0 | 0 |
| Plus Triton X-45 | 0 | 0, LM | MS | 0 | 0 | 0 |
| Plus Triton X-100 | 0 | 0 | 0, MS | 0 | 0 | 0 |
| Plus Triton X-155 | 0 | 0 | 0, L | 0 | 0 | 0 |
| Plus Igepal CO-430 | 0, L | 0, MS | S | 0 | 0 | 0 |
| Plus Igepal CO-530 | 0 | 0 | MS | 0 | 0 | 0 |
| Plus Igepal CO-630 | 0 | 0, M | MS | 0 | 0 | 0 |
| Plus Emulphor EL-620 | 0 | 0 | 0 | 0 | 0 | 0 |
| Plus Tergitol NPX | 0 | LM | MS | 0 | 0 | 0 |
| Plus Agriwet A | 0 | 0 | 0 | 0 | 0 | 0 |
| Plus Brij 30 | 0 | 0, LM | MS | 0 | 0 | 0 |
| Plus Atlox 1045 A | 0 | 0 | 0, L | 0 | 0 | 0 |
| Plus Atlox 1256 | 0 | 0 | 0 | 0 | 0 | 0 |
| Plus Arctic Syntex 036 | 0 | 0, M | MS | 0 | 0 | 0 |

⁴ Phytotoxicity (duplicate plants) at indicated p.p.m.
⁶ Preparation phytotoxic, lesions not countable.
NOTE.—0=None; L=Slight; M=Moderate; S=Severe.

Triton X-45 is a non-ionic, water-insoluble, oil-soluble alkyl aryl polyether alcohol. Triton X-100 is non-ionic iso-octyl phenoxy polyethoxy ethanol. Triton X-155 is a non-ionic water-dispersible alkyl aryl polyether alcohol. The Igepals (Antara Chemicals) are non-ionic nonyl phenoxy polyoxyethylene ethanols. Emulphor EL-620 (Antara Chemicals) is a non-ionic alkyl polyglycol ester-ether. Tergitol NPX (Carbide and Carbon Company) is a non-ionic alkyl phenyl polyethylene glycol ether. Agriwet A (Nopco Chemical Company) is anionic sulfated polyoxyethylene ethanol. Arctic Syntex 036 (Colgate-Palmolive Company) is a non-ionic polyoxyethylated nonyl phenol. Brij 30 (Atlas Powder Co.) is a non-ionic polyoxyethylene lauryl ether. Atlox 1045A (Atlas Powder Company) is a non-ionic polyoxyethylene sorbitol oleate-laurate. Atlox 1256 is non-ionic polyoxyethylene sorbitol esters of mixed fatty and resin acids.

The invention thus provides new and improved fungicidal compositions of Phytoactin and Phytostreptin which produce more effective control of fungal disease and reduce the requirements for the antifungals. The invention is especially useful for employing the technical grade antifungal preparations recovered from fermentation products. The compositions control disease at very low concentrations, and markedly increase the efficiency and economy of the treatments.

The invention is hereby claimed as follows:

1. A fungicidal composition which comprises a member selected from the group consisting of the antifungals polyamidohygrostreptin and polyaminohygrostreptin, and a polyoxyalkylene glycol monoether surface active agent.

2. A fungicidal composition which comprises the antifungal polyamidohygrostreptin and a polyoxyalkylene glycol monoether surface active agent.

3. A fungicidal composition which comprises the antifungal polyaminohygrostreptin and a polyoxyalkylene glycol monoether surface active agent.

4. A fungicidal composition which comprises an aqueous dispersion of a member selected from the group consisting of the antifungals polyamidohygrostreptin and polyaminohygrostreptin, and a polyoxyethylene glycol monoether surface active agent.

5. A fungicidal composition which comprises a member selected from the group consisting of the antifungals polyamidohygrostreptin and polyaminohygrostreptin, and a monoether of a polyoxyalkylene glycol and a hydrophobic hydroxy compound.

6. A fungicidal composition which comprises a member selected from the group consisting of the antifungals polyamidohygrostreptin and polyaminohygrostreptin, and a monoether of a polyoxyalkylene glycol and an alkyl phenol.

7. A fungicidal composition which comprises a member selected from the group consisting of the antifungals polyamidohygrostreptin and polyaminohygrostreptin, and a monoether of a polyoxyalkylene glycol and a partially esterified polyhydric alcohol.

8. A fungicidal composition which comprises the antifungal polyamidohygrostreptin and a monoether of a polyoxylene glycol and an alkyl phenol.

9. A fungicidal composition which comprises the antifungal polyaminohygrostreptin and a monoether of a polyoxyethylene glycol and an alkyl phenol.

10. A fungicidal composition which comprises the antifungal polyamidohygrostreptin and a monoether of a polyoxyethylene glycol and a partial ester of sorbitol.

11. A fungicidal composition which comprises the antifungal polyaminohygrostreptin and a monoether of a polyoxyethylene glycol and a partial ester of sorbitol.

12. The method of combating fungus diseases of plants which comprises applying to the plants a fungicidal quantity of a composition of a member selected from the group consisting of the antifungals polyamidohygrostreptin and polyaminohygrostreptin, and a polyoxyalkylene glycol monoether surface active agent.

13. The method of combating fungus diseases of plants which comprises applying to the plants a fungicidal quantity of a composition of an aqueous dispersion of a member selected from the group consisting of the antifungals polyamidohygrostreptin and polyaminohygrostreptin, and a polyoxyalkylene glycol monoether surface active agent.

14. The method of producing a fungicidal composition for treating plants which comprises dispersing in aqueous medium, a member selected from the group consisting of the antifungals polyamidohygrostreptin and polyaminohygrostreptin, and a polyoxyalkylene glycol monoether surface active agent.

References Cited in the file of this patent

UNITED STATES PATENTS

| | | |
|---|---|---|
| 2,649,401 | Haines | Aug. 18, 1953 |
| 2,777,791 | Visor et al. | Jan. 15, 1957 |
| 2,801,950 | Tate | Aug. 6, 1957 |
| 2,805,137 | Clopton | Sept. 3, 1957 |
| 2,977,282 | Gray | Mar. 28, 1961 |

FOREIGN PATENTS

| | | |
|---|---|---|
| 784,659 | Great Britain | Oct. 16, 1957 |

OTHER REFERENCES

Ziffer, J., et al.: "Phytoactin and Phytostreptin, Two New Antibiotics for Plant Disease Control," Phytopathology, 47 (9), page 539, September 1957.

Bril, C.: "Action of a Non-Ionic Detergent on Chromatophores of Rhodopseudomonas Sphercides," Biochem. et Biophys. Acta, 29, 458 (1958).

Heggested et al.: Plant Disease Reporter, 38 (9), pages 661–5, Sept. 15, 1954.

Crowdy et al.: Jour. of Exp. Botany, vol. 6, pages 371–383 (1955).

Altman et al.: Phytopathology, vol. 45, page 183 (Abstract) (1955).

Altman et al.: Plant Disease Reporter, vol. 44, pages 1081–1083 (1956).

Leben et al.: Phytopathology, vol. 44, pages 704–707 (1954).

Young et al.: Plant Disease Reporter, vol. 35, pages 540–541 (1951).

Lockwood: Phytopathology, vol. 48, pages 150–155 (1958).

Schwartz et al.: "Surface Active Agents and Detergents," Interscience Publishers, Inc., New York, 1958, Vol. II; Surfactant Antimicrobials and Microbiocides as Fungicides: pages 205, 238–241, 652–656; Antibiotic-surfactant interactions: pages 209, 231, 232–235, 318–322, 380–381, 383, 607, 611, 652.

Waksman et al.: "The Actionomycetes and Their Antibiotics," published 1953 by Williams and Wilkins, Baltimore, Md., pages 38–41, 49–50, 57–59, 81, 83–85, 90, 96, 100, 103, 174–177.

Alexopoulos: Ohio J. of Science, vol. 41 (1941), pages 425–430.

UNITED STATES PATENT OFFICE
CERTIFICATE OF CORRECTION

Patent No. 3,075,878 January 29, 1963

Jack Ziffer

It is hereby certified that error appears in the above numbered patent requiring correction and that the said Letters Patent should read as corrected below.

Column 2, line 5, strike out "Fatty acids having about 12 to 20 carbon atoms and resin"; column 4, line 19, for "chamber" read -- chambers --; column 6, line 39, for "P$^4$hytotoxicity" read -- $^4$Phytotoxicity --; column 7, line 45, for "$^6$Preparation" read -- $^7$Preparation --.

Signed and sealed this 29th day of October 1963.

(SEAL)
Attest:

ERNEST W. SWIDER
Attesting Officer

EDWIN L. REYNOLDS
Acting Commissioner of Patents